United States Patent [19]
Murphy

[11] 3,955,846
[45] May 11, 1976

[54] REVERSIBLE SEAT APPARATUS
[75] Inventor: David T. Murphy, Forest City, Iowa
[73] Assignee: Winnebago Industries, Inc., Forest City, Iowa
[22] Filed: Jan. 2, 1975
[21] Appl. No.: 537,948

[52] U.S. Cl. .............................. 296/65 R; 296/69; 297/93
[51] Int. Cl.² ................................. B60N 1/02
[58] Field of Search ............... 296/65 R, 65 A, 69; 180/775; 297/93, 92, 104, 103, 102, 101

[56] References Cited
UNITED STATES PATENTS

| | | | |
|---|---|---|---|
| 186,505 | 1/1877 | Stanley | 297/93 |
| 459,881 | 9/1891 | Cushing | 297/93 |
| 521,120 | 6/1894 | Little | 297/102 |
| 3,165,350 | 1/1965 | Willson | 297/101 X |
| 3,246,926 | 4/1966 | Link | 297/93 |
| 3,300,172 | 1/1967 | Noller et al. | 297/93 X |
| 3,751,740 | 8/1973 | Belk | 297/92 X |
| 3,785,325 | 1/1974 | Mycroft | 180/775 X |

Primary Examiner—Albert J. Makay
Assistant Examiner—Donald W. Underwood
Attorney, Agent, or Firm—Burd, Braddock & Bartz

[57] ABSTRACT

A reversible seat located in a vehicle for seating passengers in a forward direction or alternatively in a rearward direction. The seat apparatus has a frame carrying a backrest cushion and a seat cushion. Two pairs of legs attach the frame to a support secured to the floor of the vehicle. A releasable lock assembly has upright support members which engage pins in the legs to hold the frame in a first seating position and in a second seating position. A release arm connected to one of the legs is operable on application of force thereto to move the members from the pins whereby the frame can be moved to its second seating position.

28 Claims, 8 Drawing Figures

REVERSIBLE SEAT APPARATUS

BACKGROUND OF INVENTION

Reversible seats are used in rail coaches to provide forward and rear seating of passengers. These seats have movable backrests which can be located adjacent either side of the seat cushions. The same seat cushion is used for both the forward and rear seating arrangement. Furniture units designed to be disposed in a number of alternate ways are used in vehicles having restricted quarters. An example of a furniture unit usable as a seat and lounge or bed is shown by Racine et al in U.S. Pat. No. 3,463,539.

SUMMARY OF INVENTION

The invention is directed to a furniture unit that is useable to seat one or more persons alternatively in a forward direction or a rearward direction. The seat apparatus is useable in a vehicle such as mobile home or travel trailer having restricted quarters. The seat apparatus has seat means for selectively seating one or more persons in opposite directions. The seat means includes a frame. Backrest means and seat cushion means are mounted on the frame. A plurality of leg means movably mounted on the frame connect the frame to a support means secured to the vehicle floor. The leg means are movable to a first position wherein the seat means faces in a first direction and movable to a second position wherein the seat means faces in a second direction opposite the first direction. A releasable lock means cooperates with the leg means to selectively hold the leg means in the first position and the second position. The releasable lock means includes a pair of upright plate members having holes for accommodating pins mounted on the leg means. The members through the pins fix the position of the frame and also support the frame.

An object of the invention is to provide a reversible seat apparatus having a seat cushion and a backrest that are alternatively used as seat cushions and backrests. A further object of the invention is to provide a seat apparatus with an angular frame that can be pivoted to a first seat position and a second seat position opposite the first seat position. Another object of the invention is to provide a seat apparatus with a releasable locking mechanism operable to hold the seat apparatus in a first seat position and a second seat position opposite the first seat position. Another object of the invention is to provide a reversible seat apparatus which has a minimum number of parts and is simple in construction, sturdy and reliable in use, provides safety for the user, and is relatively simple and low-cost in construction.

IN THE DRAWINGS

DESCRIPTION OF PREFERRED EMBODIMENT

Figure 1:
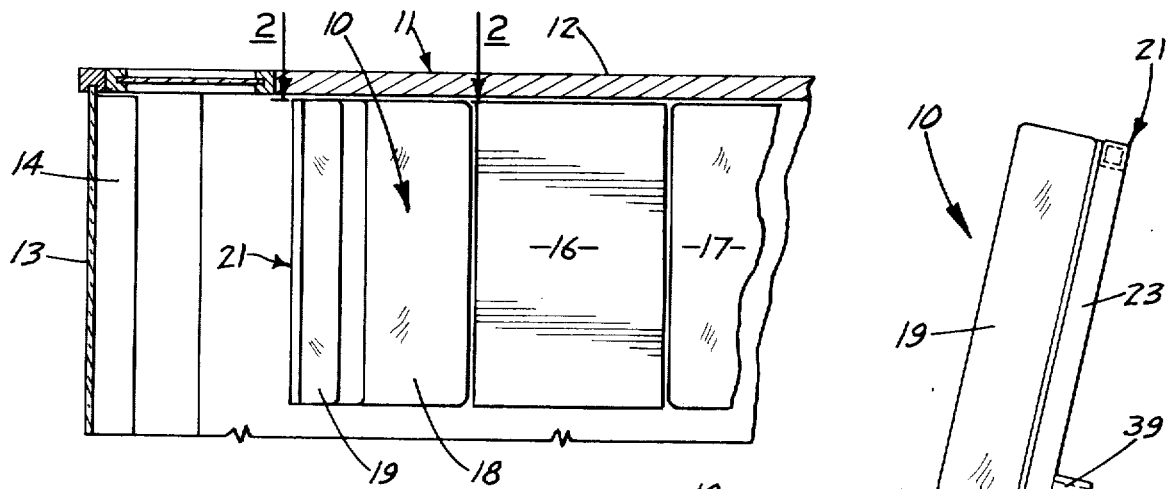
FIG. 1 is a diagrammatic plan view of the seat apparatus of the invention positioned in a vehicle.

Referring to FIG. 1, there is shown the seat apparatus of the invention indicated generally at 10 in a vehicle 11 as a motor home, travel trailer, pickup camper, or the like. Seat apparatus 10 is usable in other environments and is particularly suitable for use in locations having restricted space.

Vehicle 11 has an upright side wall 12, a front windshield 13 and a dashboard 14. Seat apparatus 10 is in its rear or first position wherein the backrest faces the rear of the vehicle. Seat apparatus 10 is located in front of a table 16. A second seat 17 is located on the opposite or rear side of table 16. Table 16 can be a fold-down table, as shown in U.S. Pat. No. 2,827,351 or U.S. Pat. No. 3,636,894. Other types of tables can be used.

Figure 2:
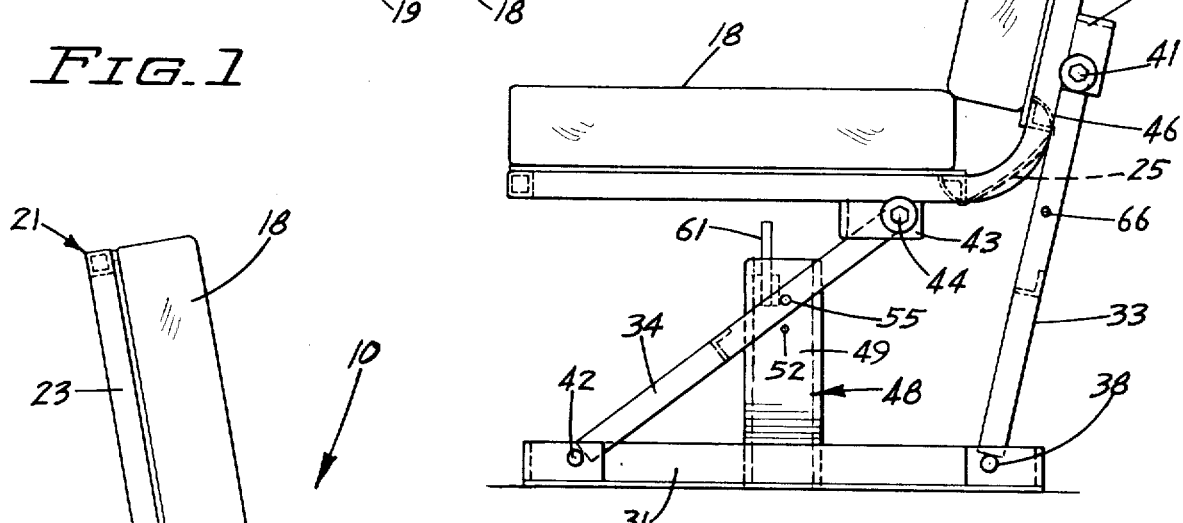
FIG. 2 is an enlarged side elevational view of the seat apparatus of FIG. 1 viewing along line 2—2 of FIG. 1.
Figure 3:
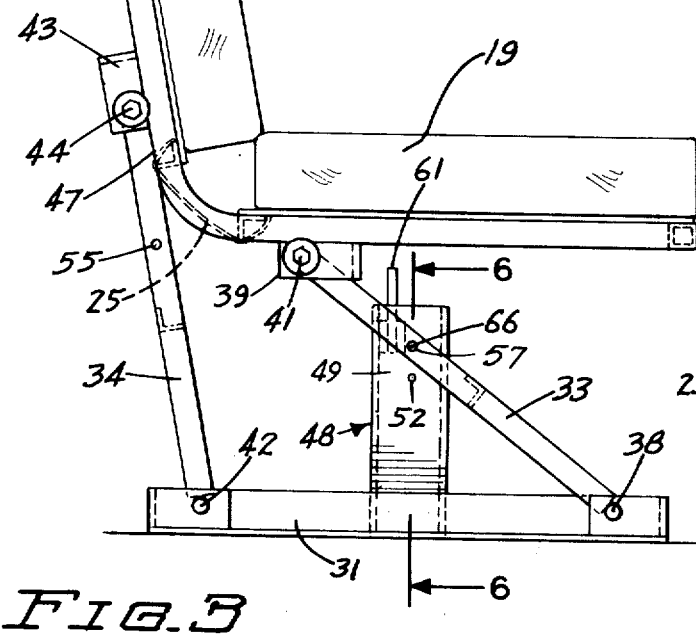
FIG. 3 is a side elevational view of the seat apparatus similar to FIG. 2 in the reverse seat position.

Seat appratus 10 has a generally horizontal seat cushion 18 and an upwardly extended backrest cushion 19. Cushions 18 and 19 are generally rectangular shaped and are substantially the same size. As shown in FIGS. 2 and 3, seat apparatus 10 is reversible so that seat cushion 18 forms a backrest and backrest cushion 19 forms a seat. When seat apparatus 10 is in this position, the occupant of the seat faces in a forward direction so that he or she can see through the windshield 13.

Figure 5:
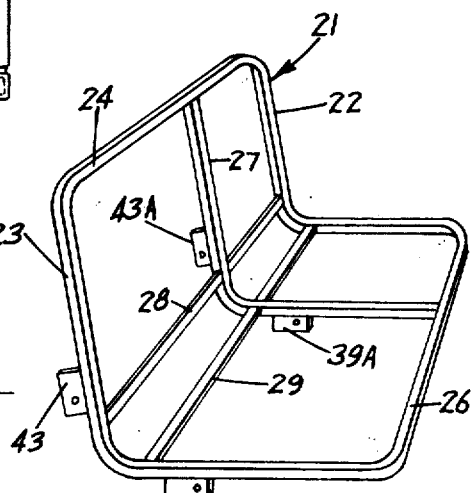
FIG. 5 is a perspective view of the frame of the seat apparatus.

Referring to FIG. 5, there is shown the frame indicated generally at 21 for seat apparatus 10. Frame 21 is a onepiece member having two sections angularly disposed relative to each other. The sections are not at an angle of approximately 101°. Each section carries either the seat cushion 18 or the backrest cushion 19. Frame 21 has angle side members 22 and 23 joined to a generally horizontal top member 24 and a horizontal front member 26. An obtuse angle center member 27 is joined to intermediate sections of members 24 and 26. Member 27 is off-center, as shown in FIG. 5. Cross members 28 an 29 extend between the side members 23 and 24 and center member 27 adjacent the apex or bend in the side members 22 and 23. The cushions 18 and 19 are secured to the frame with conventional fasteners (not shown) such as bolts, screws and the like. Straps 25 attach the adjacent portions of the cushions 18 and 19 to frame members 28 and 29. Suitable fasteners, as snaps, are used to connect straps 25 to members 28 and 29.

Figure 4:
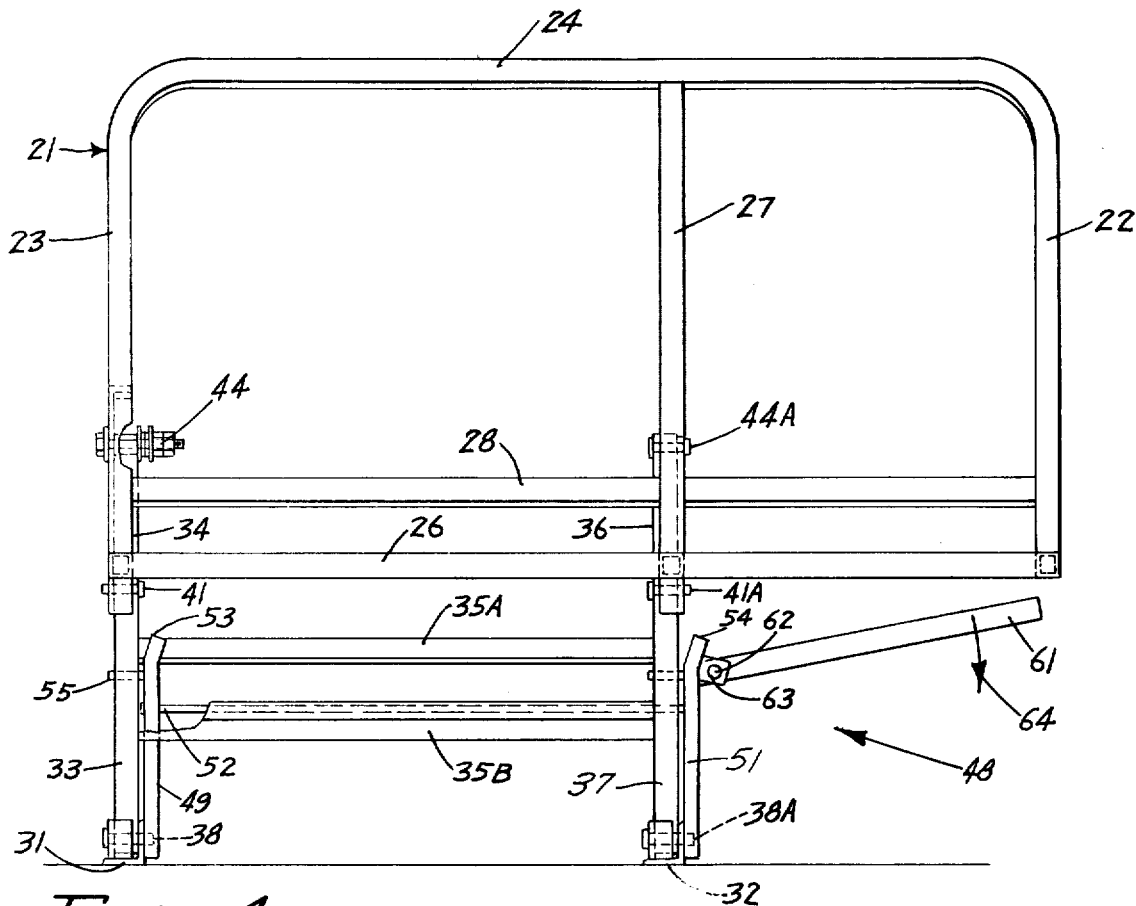
FIG. 4 is an enlarged front elevational view of the seat apparatus of FIG. 3 with the seat cushion and backrest removed.

As shown in FIG. 4, frame 21 is mounted on a pair of elongated supports 31 and 32. Supports 31 and 32 are angle members that are attached to the floor of the vehicle. The supporting structure between the frame and supports comprise a leg means having a first pair of legs 33 and 34 and a second pair of legs 36 and 37. Cross members 35A and 35B extend between and are secured to corresponding legs of each pair of legs. The first pair of legs 33 and 34 are identical with the second pair of legs 36 and 37. The following description is limited to legs 33 and 34.

Legs 33 and 34 are linear tubular members having substantially the same length. A pivot member 38 pivotally connects the lower end of leg 33 to one end of support 31. The upper end of leg 33 is located between a pair of brackets 39 secured to frame member 23. A pivot pin 41 pivotally connects leg 33 to brackets 39.

Leg 34 is pivotally connected to the opposite end of support 31 with a pivot pin 42. The upper end of leg 34 is located between a pair of brackets 43 secured to the frame member 23 adjacent to the bend in the frame member. Brackets 39 and 43 are spaced substantially the same distance from the apex or midsection of the bend in the frame member 23. A pivot pin 44 pivotally connects the upper end of leg 34 to the brackets 43. Leg 33 is in vertical alignment with the back portion of frame member 23 so that when the frame 21 is in the first seat position, shown in FIG. 2, a portion of leg 34 engages a portion 46 of the frame member 23. This limits a rearward movement of the frame member and holds the frame 21 in the first seat position. When the seat apparatus is in the reverse or second seat position, shown in FIG. 3, a portion of frame member 23 is engaged by a portion 47 of leg 34. Legs 36 and 37 are pivotally mounted on support 32 and center frame member 27 with brackets 39A and 43A and pivot pins 38A, 41A and 44A in the same manner as the legs 33 and 34 are mounted on support 31 and frame member 23.

Seat apparatus 10 is held in its first seat position and second seat position with a releasable lock means indicated generally at 48. As shown in FIG. 4, lock means 48 has a pair of upright members 49 and 51. The lower end of member 49 is secured by welds or the like to the center portion of support 31. In a similar manner, the lower end of member 51 is secured to the midportion of support 32. The upper portions of members 49 and 51 are connected with a horizontal rod 52. The opposite ends of rod 52 are attached by welds or the like to the back of members 49 and 51. Members 49 and 51 are channel-shaped members which are normally located in upright positions. Member 49 has an upwardly and outwardly top flange 53 directed away from leg 34. The upper end of member 51 has an upwardly and outwardly directed flange 54 directed away from leg 36. A pin 55 having a lateral projection 56 is secured to the leg 34. Pin projection 56 extends through a hole in the upper part of member 49 below flange 53. Leg 36 carries a similar pin 58 having a projection 59. Projection 59 extends through a hole 60 in plate 51. Pins 55 and 58 hold the legs 34 and 36 in fixed positions relative to the supports 31 and 32. As shown in FIG. 2, pin 55 on leg 34 cooperates with member 49 to hold the seat in its first seating position. As shown in FIG. 3, pin 58 cooperates with member 49 to hold the seat in the second or reverse seating position.

Figures 6, 7, 8:
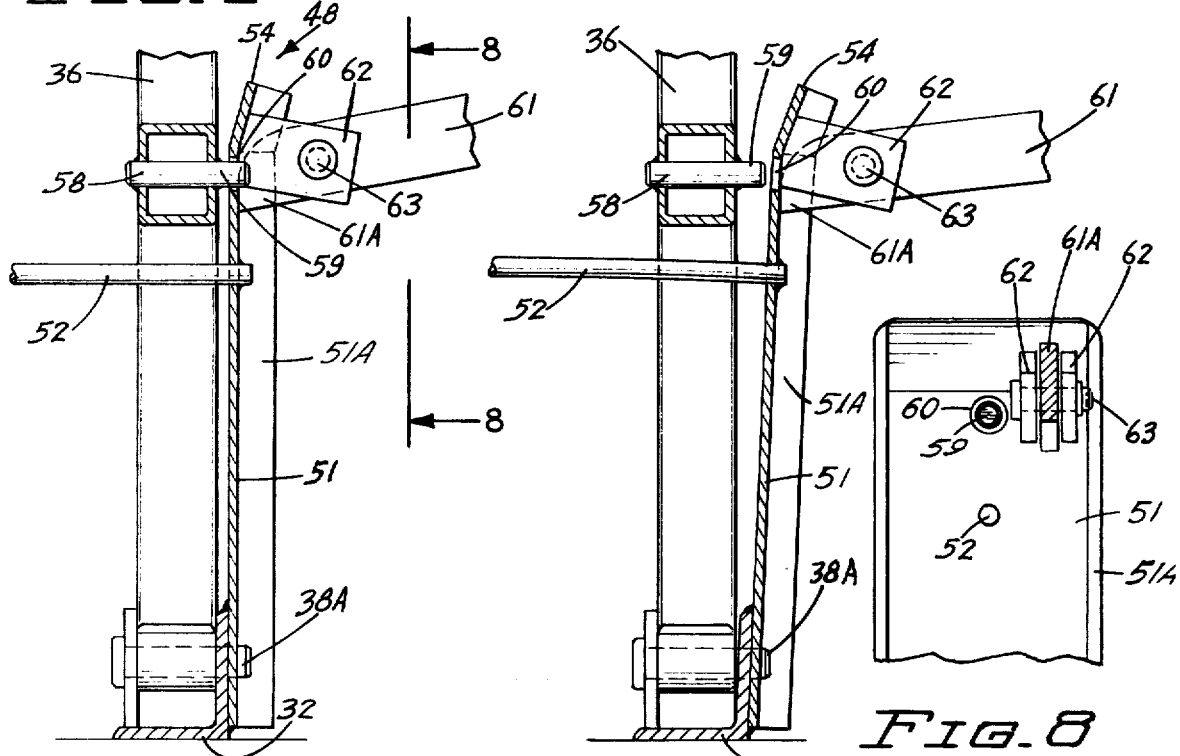
FIG. 6 is an enlarged sectional view taken along the line 6—6 of FIG. 3.
FIG. 7 is a sectional view similar to FIG. 6 showing the lock means for the legs in the released position.
FIG. 8 is a sectional view taken along line 8—8 of FIG. 6.

The lock means 48 has release means comprising a laterally directed release arm 61. Arm 61 is used to apply a force on members 49 and 51 which bias the members 49 and 51 in an outward direction to release the members from pins 55 and 58. Members 49 and 51 being secured to the upright flanges of supports 31 and 32 flex or bend the flanges so that the supports 31 and 32 function as biasing means to urge the members in upright lock position. When members 49 and 51 are moved in an outward direction, as shown in FIG. 7, the back of the members move away from the pins so that legs 33, 34, 36 and 37 are free to pivot on their respective pivot axes and thereby angularly turn the frame member 23 from the first seating position to the second seating position.

Release arm 61 has an inner end portion 61A located between a pair of ears 62. Ears 62 laterally extend from the upper end of member 51 and are secured thereto. The pivot pin 63 pivotally connects the arm 61 to the ears 62. End portion 61A of arm 61 bears against the outside of member 51. When arm 61 is moved in a downward direction by the application of force to the arm, as indicated by arrow 64, supports 31 and 32 are flexed in a lateral outward direction moving the members 49 and 51 away from pins 55 and 58. The force applied to member 51 by arm 61 is transmitted through rod 52 to the member 49.

Upright flanges or bars 51a are secured to the sides of member 51. Bars 51a reinforce the member 51 so that the support 32 is subjected to torsion forces which bias member 51 to the upright lock position.

Frame 21 is free to pivot about the pivot pins 38, 38A, 41, 41A, 42, 44, and 44A to change the seating position of the cushions 18 and 19. When the seat is in the second or reversed seat position, leg 33 is located adjacent plate 49. Leg 33 carries a laterally directed pin 66 which fits into hole 57 in member 49 thereby lock the seat in the second seat position. The leg 37 has a similar projection which locks into the hole 60 in member 51 when the seat is in the second seating position. During the movement of the frame 21 from the first seating position shown in FIG. 2 to the second seating position shown in FIG. 3 the pin 66 will engage and ride on the outwardly directed flange on the upper part of member 49 and move member 49 in an outward direction until pin 66 is aligned with hole 57. Member 49 will then move to the upright position wherein pin 66 projects through hole 57. Pin 59 will ride on flange 54 until the end of the pin 59 is aligned with hole 60 in member 51. Member 51 is biased in an outward direction by pin 59 and will return to its upright position, as shown in FIG. 6, when pin 59 is in hole 60. This locks the seat in the reverse or second position.

While there has been shown and described a preferred embodiment of the seat apparatus of the invention, it is understood that changes in the material, size and structure may be made by those skilled in the art without departing from the invention. Furthermore, the seat apparatus of the invention can be used in environments other than vehicles including but not limited to mobile homes, residential homes, commercial and industrial environments, aircraft, buses, railway coaches and mobile offices.

The embodiments of the invention in which an exclusive property or privilege is claimed are defined as follows:

1. In a vehicle having a floor, a side wall and a front wall: a seat means for selectively seating one or more persons facing the front wall or facing away from the front wall, said seat means including a frame, backrest means and seat means mounted on the frame, support means securable to the floor, leg means movably mounted on the support means and movably mounted on the frame, said leg means movable to a first position wherein the seat means faces toward the front wall and movable to a second position wherein the seat means faces away from the front wall, and releasable lock means cooperating with the leg means to selectively hold the leg means in the first position and the second position, said releasable lock means including upright means fixed at one end and having a portion located adjacent the leg means at its other end, pin means secured to the leg means, said pin means engageable with the upright means to hold the leg means is fixed positions when the leg means are in the first position and second position, and means to bend the other end of the upright means out of engagement with the pin means whereby the leg means can be moved from the first position to the second position and from the second position to the first position.

2. The structure of claim 1 wherein: said frame has a first section and a second section, said second section being disposed at an angle relative to the first section, said backrest means being mounted on the first section, and said seat means being mounted on the second section.

3. The structure of claim 2 wherein: the leg means include first leg means connected to the first section and the support means, and second leg means connected to the second section and the support means.

4. The structure of claim 3 wherein: the first leg means includes a pair of legs and the second leg means includes a pair of legs.

5. The structure of claim 4 including: pivot means connecting the ends of each leg to the frame and support means respectively.

6. The structure of claim 3 wherein: the first leg means engages a part of the first section of the frame and the second leg means engages the releasable lock means when the leg means are in the first position, and the second leg means engages a part of the second section of the frame and the first leg means engages the releasable lock means when the leg means are in the second position.

7. The structure of claim 1 wherein: the portion of the upright means has a hole to accommodate the pin means.

8. The structure of claim 1 wherein: the means to bend the upright means includes an arm secured to the portion of the upright means, said arm movable to bend the upright means away from the leg means thereby releasing the upright means from the pin means.

9. In a vehicle having a floor, a side wall and a front wall: a seat means for selectively seating one or more persons facing the front wall or facing away from the front wall, said seat means including a frame, said frame having a first section and a second section, said second section being angularly disposed relative to the first section, backrest means and seat means mounted on the frame, said backrest means being mounted on the first section, said seat means being mounted on the second section, support means securable to the floor, leg means movably mounted on the support means, and movably mounted on the frame, said leg means movable to a first position wherein the seat means faces toward the front wall and movable to a second position wherein the seat means faces away from the wall, said leg means including a first pair of legs connected to the first section and the support means and a second pair of legs connected to the second section and the support means, pivot means connecting the ends of each leg to the frame and support means respectively, and releasable lock means cooperating with the leg means to selectively hold the leg means in the first position and the second position, said releasable lock means including a pair of upright means, each of said upright means having a portion located adjacent a leg of the first pair of legs, said first and second pairs of legs each having pin means selectively engageable with the upright means to hold the leg means in a fixed position, and means to release the pair of upright means from the pin means whereby the leg means can move to the first position and second position thereby changing the seating arrangement of the seat apparatus, said means to release the pair of upright means including an arm secured to the portion of one of the upright means, and rod means extended between and secured to the upright means, said arm being movable to bend both upright means away from the adjacent leg thereby releasing both upright means from the pin means.

10. The structure of claim 9 wherein: the portions of the pair of upright means have holes to accommodate the pin means.

11. The structure of claim 9 wherein: the first legs engage portions of the first section of the frame and the second legs engage the releasable lock means when the leg means are in the first position and the second legs engage portions of the second section of the frame and the first legs engage the releasable lock means when the leg means are in the second position.

12. A seat apparatus for selectively seating one or more persons in a first direction and in a second direction opposite the first direction comprising: a frame, backrest means mounted on the frame, seat means mounted on the frame, support means providing a base for the seat apparatus, leg means movably mounted on the support means and movably mounted on the frame, said leg means movable to a first position wherein the seat means faces in the first direction and movable to a second position wherein the seat means faces in the second direction, and releasable lock means cooperating with the leg means to selectively hold the leg means in the first position and the second position, said releasable lock means including upright means fixed at one end and having a portion located adjacent the leg means at its other end, said leg means having pin means engageable with the upright means to hold the leg means in a fixed position, and means to bend the other end of the upright means out of engagement with the pin means whereby the leg means can be moved to the first position, said means to release the upright means from the pin means including an arm secured to the portion of the upright means, said arm movable to bend the upright means away from the leg means thereby releasing the upright from the pin means.

13. The structure of claim 12 wherein: the frame has a first section and a second section, said second section disposed at an angle relative to the first section, said backrest means being mounted on the first section, and said seat means being mounted on the second section.

14. The structure of claim 13 wherein: the leg means include first leg means connected to the first section and the support means, and second leg means connected to the second section and the support means.

15. The structure of claim 14 wherein: the first leg means includes a pair of legs and the second leg means includes a pair of legs.

16. The structure of claim 15 including: pivot means connecting the ends of each leg to the frame and support means respectively.

17. The structure of claim 14 wherein: the first leg means engages a part of the first section of the frame and the second leg means engages the releasable lock means when the leg means are in the first position, and the second leg means engages a part of the second section of the frame and the first leg means engages the releasable lock means when the leg means are in the second position.

18. The structure of claim 12 wherein: the portion of the upright means has a hole to accommodate the upright means.

19. A seat apparatus for selectively seating one or more persons in a first direction and in a second direction opposite the first direction comprising: a frame, backrest means mounted on the frame, seat means mounted on the frame, support means providing a base for the seat apparatus, leg means movably mounted on the support means and movably mounted on the frame, said leg means movable to a first position wherein the seat means faces in the first direction and movable to a second position wherein the seat means faces in the second direction, and releasably lock means cooperating with the leg means to selectively hold the leg means in the first position and the second position, said releasable lock means including upright means fixed at one end and having a portion located adjacent the leg means at its other end, pin means secured to the leg means, said pin means engageable with the upright means to hold the leg means in fixed positions when the leg means are in the first position and the second position, and means to bend the other end of the upright means out of engagement with the pin means whereby the leg means can move between the first position and the second position and from the second position to the first position.

20. The structure of claim 20 wherein: the means to bend the upright means includes an arm secured to the upright means, said arm movable to bend the upright means away from the leg means thereby releasing the upright means from the pin means.

21. The structure of claim 20 wherein: the frame has a first section and a second section, said leg means including first leg means connected to the first section of the frame and the support means, and second leg means connected to the second section of the frame and support means.

22. The structure of claim 21 wherein: the first leg means includes a pair of legs, and the leg means includes a pair of legs.

23. The structure of claim 22 including: pivot means connecting the ends of each leg to the frame and support means respectively.

24. The structure of claim 19 wherein: the leg means includes first leg means connected to the frame and support means and second leg means connected to the frame and support means, said first leg means engaging a part of the frame and the second leg means engaging the releasable lock means when the leg means are in the first position, and the second leg means engages a part of the frame and the first leg means engages the releasable lock means when the leg means are in the second position.

25. The structure of claim 19 wherein: said leg means includes a first pair of legs connected to the frame and support means and a second pair of legs connected to the frame and support means, pivot means connecting the ends of each leg to the frame and support means respectively, said releasable lock means including a pair of upright means, said of said upright means having a portion adjacent a leg of the first pair of legs, said first and second pairs of legs each having pin means selectively engageable with the upright means to hold the leg means in a fixed position, and means to release the pair of upright means from the pin means whereby the leg means can move to the first position and second position, thereby changing the seating arrangement of the seat apparatus.

26. The structure of claim 25 wherein: the portions of the pairs of upright means have holes to accommodate the pin means.

27. The structure of claim 25 wherein: the means to bend the pair of upright means includes an arm secured to a portion of one of the upright means and rod means extended between and secured to the upright means, said arm being movable to bend both upright means away from the adjacent legs thereby releasing both upright means from the pin means.

28. The structure of claim 25 wherein: the first legs engage portions of the frame and the second legs engage the releasable lock means when the leg means are in the first position, and the second legs engage portions of the frame and the first legs engage the releasable lock means when the leg means are in the second position.

* * * * *